Patented Apr. 24, 1934

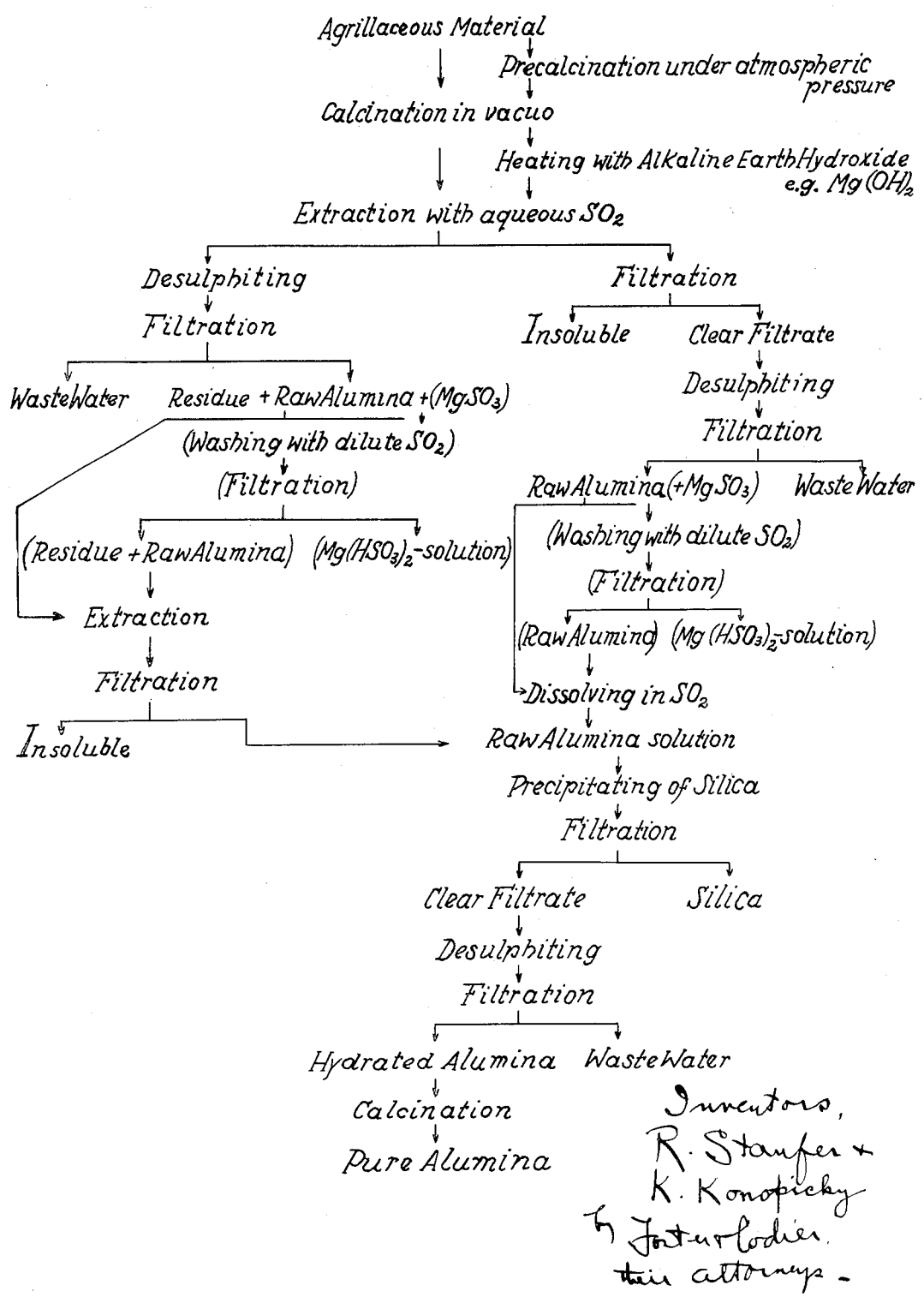

1,956,139

UNITED STATES PATENT OFFICE 1,956,139

PROCESS FOR TREATING ARGILLACEOUS MATERIAL

Richard Staufer and Kamillo Konopicky, Vienna, Austria, assignors to Alterra A. G., Luxemburg, Luxemburg, a joint-stock company of Luxemburg Application July 16, 1931, Serial No. 551,302
In Austria July 26, 1930

20 Claims. (Cl. 23—143)

The present invention relates to the production of alumina from argillaceous materials.

It has already been proposed to decompose argillaceous substances with aqueous sulphurous acid and to calcine the material before decomposition. This process, however, fails when applied to the most important starting materials of the type of the kaolins and clays, for which reason frequent attempts have been made to render the alumina in the argillaceous substance soluble by a suitable pretreatment with chemicals.

According to this invention, the argillaceous substance is rendered capable of direct decomposition with sulphurous acid by effecting the previous calcination in a vacuum, preferably a high vacuum, at temperatures below 900° C., the actual temperature in each case being ascertained by preliminary trials. After calcination in a vacuum there remains a specific compound of aluminium oxide and silicic acid which can be decomposed more easily by sulphurous acid than the residue from calcination under atmospheric pressure. The process according to this invention thus enables a greater proportion of the argillaceous substance than hitherto to become dissolved in sulphurous acid and consequently a greater proportion of alumina to be recovered therefrom.

When, however, the water of constitution is expelled at the start by heating in a vacuum, the mass becomes to a great extent scattered as dust owing to the escape of the water vapour. It is therefore in general advisable for the technical execution of the process to precede the calcination under diminished pressure by heating at atmospheric pressure, whereby the disadvantage of the considerable scattering is avoided without the favorable effect of the calcination in vacuo being detrimentally influenced. If, however, a material is treated, which gives off its water of constitution at a temperature, already in the neighbourhood of the favorable temperature for the actual calcination, so that it would be difficult to set a sharp limit between the preheating and the calcination in vacuo, or if the calcination in two stages offers technical difficulties for other reasons, it is preferable to carry out the whole calcination process in a vacuum.

It has been further found that it is advantageous to subject the calcined material, before extraction with sulphurous acid, to a further intermediate treatment, which renders it possible to obtain a more concentrated solution of aluminium bisulphite. For this purpose the calcined material is treated with an alkaline earth hydroxide, particularly magnesium hydroxide, preferably at increased temperature. In this way reaction products are formed, which are much more easily decomposed by sulphurous acid than the calcined material in its original condition.

The argillaceous material is then reduced to a finely divided condition, for example by elutriation, and the finely divided material extracted with aqueous sulphurous acid, this treatment being with advantage carried out at elevated temperature and elevated pressure, in order to obtain more rapid solution and a better yield. It has been further found to be advantageous to effect this extraction by consecutive treatments with portions of the total quantity of aqueous sulphurous acid employed for the extraction, since in this way the final result is more rapidly attained. The rate of solution soon becomes very small, even when employing considerable excesses of acid. This is probably connected with the fact that a definite hydrogen ion concentration is necessary for the solution of the compound formed on calcination. Owing to the formation of aluminium bisulphite, however, the acidity of the sulphurous acid, which is in itself slight, is so rapidly reduced that the material is no longer attacked. As a result, the following favorable method of operating has been found:

At first only a portion of the aqueous solution of sulphurous acid is allowed to react with an excess of calcined argillaceous material. After a few minutes the solution is drawn off and replaced by a fresh solution of sulphurous acid. This treatment is repeated until the calcined material is thoroughly extracted.

The solution, separated, for example by filtration, from the residue after completion of the decomposition, contains aluminium bisulphite, iron salts, soluble silicic acid and an excess of sulphur dioxide. The alumina may be precipitated in known manner from this sulphurous acid extract by expelling the $SO_2$.

If the above described intermediate treatment is carried out with alkaline earth hydroxides, the sulphurous acid extract will besides the above mentioned constituents also contain alkaline earth bisulphite. In this case the aluminium is precipitated from the sulphurous acid extract, by expelling the $SO_2$, as basic sulphite together with a portion of the alkaline earth sulphite, and thereafter freed from the alkaline earth sulphite by washing out with aqueous sulphurous acid. By repeating the precipitation and extraction with $SO_2$, the purity can be increased to any desired degree.

The crude alumina obtained in this manner, which contains only very little iron and some silicic acid, can be directly employed for many purposes. In order to produce pure alumina, such as is, for example, required for the electrolytic production of aluminium, the precipitate must be freed from silicic acid by further purification.

A new method for this separation of alumina from silicic acid has now been found, which attains its object more simply and more completely than the known methods and is therefore suitable for general application, even independently of the described method of decomposition.

Silicic acid occurring with aluminium hydroxide is very difficult to remove therefrom. On dissolving this aluminium hydroxide or basic aluminium sulphite, the silicic acid also goes into solution and on reprecipitating the aluminium hydroxide is precipitated with the latter. In order to overcome this difficulty, it has been proposed to heat the mixture of aluminium hydroxide and silicic hydroxide to a temperature of about 120° C. in order to effect partial dehydration of both hydrates; presumably only the alumina is dissolved out by sulphurous acid from the mixture pretreated in this way. Apart from the fact that in this known process the considerable quantities of water, contained in the hydrates, must be evaporated, this process fails in practice owing to the impossibility of simultaneously fulfilling two conflicting conditions, i. e. dehydrating the silicic hydroxide as completely as possible whilst leaving a considerable quantity of water in the alumina. If the silicic acid is heated until it becomes insoluble, the alumina is also no longer soluble in sulphurous acid. If, on the other hand, the working conditions are so selected that a considerable quantity of water still remains in the alumina, the silicic acid also again goes into solution and is therefore also present as a disturbing impurity in the end product. Frequent repetition of this treatment is absolutely valueless since it is absolutely impossible to effect a systematic enrichment of silicic acid or of alumina by this method.

The new process according to this invention does not make use of the dehydration of the hydroxides. The mixture of aluminium hydroxide and silicic hydroxide precipitated by heating the solution, in order to separate the alumina from the silicic acid, is again dissolved with its total water content, preferably in as fresh a condition as possible, i. e. without ageing, in aqueous sulphurous acid, a small excess of the latter being, with advantage, employed, whereby a large part of the silicic acid also again goes into solution. The solution, separated from insoluble matter, is then heated under conditions which practically exclude any escape of $SO_2$, preferably under pressure, at gradually increasing temperature, until it becomes turbid and finally a precipitate separates out by coagulation. When the ratio of the $SO_2$ concentration to alumina is correctly chosen this precipitate consists for by far the greater part of silicic acid and only for a small part of aluminium hydroxide, which, however, on cooling again becomes dissolved, whilst the silicic acid remains undissolved. The solution is therefore left, preferably until cooled down, in contact with the precipitate, and thereafter separated therefrom.

In this process of separation, a great deal depends upon correctly selecting the excess of sulphurous acid for dissolving the freshly precipitated mixture of aluminium hydroxide and silicic hydroxide. Both too great and too small an amount are detrimental. If the excess is too great the precipitation of silicic acid only commences at too high a temperature, if too little sulphurous acid is present the precipitation commences too early, in both cases precipitation is incomplete.

This coagulation process can also be particularly advantageously carried out in such a way that the $SO_2$ is not completely prevented from escaping on heating the solution, adjusted to the requisite excess of $SO_2$, but a limited portion of $SO_2$ is withdrawn from the solution during the process of heating and again introduced during the period of cooling. Under these conditions a large quantity of the aluminium hydroxide at first also separates out. This aluminium hydroxide, however, again dissolves as the solution cools down and becomes saturated. This expulsion and re-solution of a portion of the sulphurous acid, which has the advantage that the coagulation of the silicic acid on heating is more easily regulated, is most simply effected by allowing the heating process to take place in a closed vessel, the gas space of which is suitably large in proportion to the liquid space. The sulphur dioxide evolved on heating collects in the gas space and is thereafter again absorbed by the cooling solution.

The heat requirement of the coagulation process is with advantage diminished by means of a heat exchange, the entering solution being preheated by the heat given off by the discharging liquid.

If the precipitation of silicic acid is repeated in the described manner, an alumina of very great purity which is suitable for all chemical purposes, can be obtained. The aluminium hydroxide is worked up in known manner either to calcined alumina or to aluminium salts.

An abbreviated process may be carried out as follows:—

Instead of filtering off the sulphurous acid extract from the undissolved residue, the $SO_2$ is completely expelled from the unseparated mixture of solution and residue, so that the precipitated aluminium hydroxide, basic aluminium sulphite and silicic acid join with the residue, whilst the iron remains in solution. The solution is separated from the undissolved matter, for example by filtration, after which the soluble alumina and silicic acid are extracted from the filtration residue by dissolving in aqueous sulphurous acid and the resulting solution treated in the above described manner in order to separate the silicic acid from the alumina. In this way one filtration can be avoided.

In the described process the presence of sulphuric acid and its salts has a detrimental effect in all stages, the yield being reduced thereby. It is therefore advisable in carrying out this process to resort to all procedures, which are capable of preventing the formation of sulphate. Thus, inter alia, the starting materials should be as free as possible from ferric iron and the water employed should be as free as possible from air. It is also advisable to avoid catalysts, such as selenium, copper, etc., which promote the decomposition and autoxidation of sulphur dioxide and, if necessary, even to employ admixtures for stabilizing the sulphurous acid, such as have been frequently proposed for this purpose (e. g. glycerine, phenols, etc.).

If comparatively large quantities of iron, calcium or magnesium are present in the starting material, it is advisable first to remove these impurities. Other impurities such as sand etc. are with advantage removed by elutriation.

*Examples*

1. The treatment of a clay is described, which, after calcining at 1200° C., showed the following composition: 44.6% of $Al_2O_3$, 0.8% of $Fe_2O_3$, 0.3% of $TiO_2$ and 54.0% of $SiO_2$.

This clay, after heating for a short time to 500° C., under normal pressure, was calcined for a few minutes in a vacuum of 10 mms. of mercury at 700° C. Of 100 kgms. of this clay there remained after calcination 88.5 kgms. The calcined clay was finely ground and stirred with water, after which the resulting suspension was saturated with sulphurous acid in an autoclave, provided with an acid-resisting lining, and then heated for half an hour to 170° C. After heating, a portion of the sulphurous acid was expelled from the liquid by releasing the pressure and the liquid thereafter filtered off. On carefully heating the clear solution, a portion of the silicic acid was first precipitated and thereafter a mixture of aluminium hydroxide, basic aluminium sulphite and silicic acid precipitated from the filtrate by completely freeing the solution from $SO_2$. The freshly separated precipitate was dissolved in a just sufficient quantity of aqueous sulphurous acid and filtered off from the undissolved silicic acid. The solution remaining after the expulsion of the excess of sulphur dioxide contained 6.1 gms. of $Al_2O_3$, and 9.2 gms. of $SO_2$ per litre. By employing stronger sulphurous acid, elevated temperature and, if necessary, increased pressure, a solution is obtained which contains considerably more aluminium oxide. The careful adjustment of the ratio of aluminium oxide to sulphurous acid, which is very important for the success of the process, is either effected by dissolving the crude alumina in an exactly measured quantity of sulphurous acid or by employing an excess of sulphurous acid, and thereafter removing the latter by expulsion in known manner. The most advantageous procedure is to heat the solution to about 80° C. and to free it completely from gas. No alumina is precipitated from solutions, in which the proportion of $Al_2O_3$ to $SO_2$ is correctly adjusted, even when employing a slight vacuum.

The solution was then pumped into a countercurrent heat exchanger, in which it was gradually preheated by the liquid discharging from the heated pressure vessel. With gradually rising temperature, the solution began to turn turbid at 120 to 130° C. under its own vapour pressure with the separation of flocks of silicic acid. This turbidity gradually increases and finally reaches its maximum at 140 to 175° C. (depending on the ratio of $SO_2$ to aluminium oxide contained therein). With too great an excess of sulphurous acid the thermic decomposition of the $SO_2$ commences before the silicic acid is completely precipitated. With too small a content of $SO_2$ aluminium hydroxide also separates out owing to hydrolysis, in which case the precipitation of silicic acid also remains incomplete.

The liquid was drawn off from the heat exchanger at a temperature of 80° C. and freed by filtration from the separated silicic acid and the sulphurous acid finally expelled as completely as possible and recovered in a column.

After washing and calcining the alumina was found to have the following composition:—99.91% of $Al_2O_3$, 0.015 of $Fe_2O_3$ and 0.07 of $SiO_2$.

The yield of pure alumina amounted to 93% of the theoretical yield.

2. In order to make use of the intermediate treatment with alkaline earth hydroxide, 1 part by weight of magnesium hydroxide was added to 3 parts by weight of the clay, which had been calcined in a vacuum, and the mixture stirred into a paste. Instead of $Mg(OH)_2$, magnesium oxide or basic magnesium carbonate or, in general, starting materials which react like magnesium hydroxide in the presence of water, may be employed. This pulp was then maintained for two hours at a temperature of 175° C. By extracting the material, pretreated in this manner, with sulphurous acid about 90% of the alumina contained in the raw material was dissolved as well as the magnesium oxide, whilst the greater portion of the silicic acid remained behind in a jelly-like form. On heating the filtered solution the aluminium separated out together with magnesium sulphite as a mixture of hydroxide and basic sulphite. The magnesium was removed by carefully washing the precipitate with 1% sulphurous acid until only 0.2% (calculated MgO) remained. The crude alumina, obtained in this manner, still contained silicic acid. In order to obtain pure alumina the crude alumina must be freed from this silicic acid, for which purpose the process, described in Example 1, is in like manner suitable. The resulting magnesium sulphite may be reconverted into MgO by gently calcining, whereby the eliminated sulphurous acid is also completely recovered for use in the process. $CaSO_3$ on calcining only gives off one third of its sulphur content and is thereby converted into a mixture of CaO and $CaSO_4$, but is otherwise just as suitable for the process as magnesia.

What we claim is:—

1. A process of treating argillaceous material which consists in calcining the material at a temperature below 900° C. in a vacuum, extracting the calcined material with aqueous sulphurous acid and recovering crude aluminia from the sulphurous acid extract by desulphiting.

2. A process as defined in claim 1 wherein the calcination under reduced pressure is preceded by heating at atmospheric pressure, in order to expel a portion of the water of constitution before heating in a vacuum.

3. A process of treating argillaceous material which consists in calcining the material at a temperature below 900° C. in a vacuum, subjecting the calcined material to a subsequent treatment with an alkaline earth hydroxide in the presence of water, extracting the calcined material with aqueous sulphurous acid and recovering crude alumina from the sulphurous acid extract.

4. A process of treating argillaceous material which consists in calcining the material at a temperature below 900° C. in a vacuum, subjecting the calcined material in the presence of water to a subsequent treatment with an alkaline earth hydroxide at elevated temperature, extracting the calcined material with aqueous sulphurous acid and recovering crude alumina from the sulphurous acid extract.

5. A process of treating argillaceous material, which consists in calcining the material at a temperature below 900° C. in a vacuum, subjecting the calcined material to a subsequent treatment with an alkaline earth hydroxide in the presence of water, extracting the calcined material with aqueous sulphurous acid, precipitating the alumina together with a portion of alkaline earth by expelling sulphur dioxide from the sulphurous acid extract, and freeing the precipitate from the alkaline earth by washing it out with a dilute aqueous solution of sulphur dioxide.

6. A process of treating argillaceous material which consists in calcining the material at a temperature below 900° C. in a vacuum, extracting the calcined material with sulphur dioxide in the presence of water at elevated temperature and elevated pressure and recovering crude alumina from the sulphurous acid solution by desulphiting same.

7. A process of treating argillaceous material which consists in calcining the material at a temperature below 900° C. in a vacuum, extracting the calcined material with sulphur dioxide in the presence of water at elevated temperature, completely desulphiting the unseparated mixture of solution and solids, to precipitate both the silica and the alumina, separating the solution from the undissolved matter, extracting the residue by lixiviating it with an aqueous solution of sulphur dioxide, and recovering crude alumina from the finally resulting solution by desulphiting the same.

8. A process of treating argillaceous material which consists in calcining the material at a temperature below 900° C. in a vacuum, extracting the material with aqueous sulphurous acid at elevated temperature by consecutive treatments with portions of the total quantity of the aqueous sulphurous acid employed for the extraction, and recovering crude alumina from the sulphurous acid extract by desulphiting the same.

9. A process of treating argillaceous material which consists in calcining the material at a temperature below 900° C. in a vacuum, extracting the material with aqueous sulphurous acid at elevated temperature and elevated pressure by consecutive treatments with portions of the total amount of the aqueous sulphurous acid employed for the extraction, and recovering crude alumina from the sulphurous acid extract by desulphiting the same.

10. A process of treating argillaceous material which consists in calcining the material at a temperature below 900° C. in a vacuum extracting the calcined material with aqueous sulphurous acid and recovering crude alumina from the sulphurous acid extract by desulphiting the same, dissolving the precipitate, without drying it, in aqueous sulphurous acid and heating the solution at gradually increasing temperature under conditions which practically exclude any escape of $SO_2$ until it commences to become turbid and the silicic acid finally coagulates, after which the solution is left in contact with the precipitate, and thereafter separated therefrom and desulphited.

11. A process of treating argillaceous material which consists in calcining the material at a temperature below 900° C. in a vacuum, extracting the calcined material with aqueous sulphurous acid and recovering crude alumina from the sulphurous acid extract by desulphiting the same, dissolving the precipitate without drying it, in aqueous sulphurous acid and heating the solution at a temperature gradually increasing up to over 100° C. under conditions which practically exclude an escape of $SO_2$, until it commences to become turbid and the silicic acid finally coagulates, after which the solution is left in contact with the precipitate, and thereafter separated therefrom and desulphited.

12. A process of treating argillaceous material which consists in calcining the material at a temperature below 900° C. in a vacuum, extracting the calcined material with aqueous sulphurous acid and recovering crude alumina from the sulphurous acid extract by desulphiting the same, dissolving the precipitate without drying it, in aqueous sulphurous acid and heating the solution at a temperature gradually increasing from 120 to 175° C. under coditions which practically exclude an escape of $SO_2$, until it commences to become turbid and the silicic acid finally coagulates, after which the solution is cooled in contact with the precipitate, and thereafter separated therefrom and desulphited.

13. A process of treating argillaceous material which consists in calcining the material at a temperature below 900° C. in a vacuum, extracting the calcined material with aqueous sulphurous acid and recovering crude alumina from the sulphurous acid extract by desulphiting the same, dissolving the precipitate, without drying it, in a freshly precipitated condition in aqueous sulphurous acid and heating the solution at gradually increasing temperature under conditions which practically exclude any escape of $SO_2$ until it commences to become turbid and the silicic acid finally coagulates, after which the solution is left in contact with the precipitate until cooled down and thereafter separated therefrom and desulphited.

14. A modification of the process claimed in claim 13, wherein a limited portion of the $SO_2$ is removed from the solution during the process of heating and again introduced during the period of cooling.

15. A modification of the process claimed in claim 13, wherein a limited portion of the $SO_2$ is removed from the solution during the process of heating and again introduced during the period of cooling by heating the solution in a closed vessel, the gas space of which is large in proportion to the liquid space.

16. A process for removing silicic acid from a precipitated mixture of silicic acid and aluminium compounds, which consists in dissolving the mixture, without drying it, in aqueous sulphurous acid and heating the solution at gradually increasing temperature under its own vapor pressure, so as practically to exclude an escape of $SO_2$, until it commences to become turbid and the silicic acid finally coagulates, after which the solution is left in contact with the precipitate until cooled down, and thereafter separated therefrom.

17. A process for removing silicic acid from mixtures of hydrated silicic acid and aluminium hydroxide, which consists in dissolving the mixture in a freshly precipitated state in aqueous sulphurous acid, heating the solution under its own vapor pressure at gradually increasing temperature while temporarily reducing the said vapor pressure, so as to expel part of the sulphur dioxide, the silicic acid being deposited thereby together with aluminium compounds, allowing the mixture of solution and solids to cool down while reintroducing sulphur dioxide to nearly the same concentration as at the beginning of the heating process, separating the solution from the precipitate and recovering pure alumina by desulphiting the solution.

18. A process for removing silicic acid from mixtures of hydrated silicic acid and aluminium hydroxide, which consists in dissolving the mixture in a freshly precipitated state in aqueous sulphurous acid, heating the solution under its own vapor pressure at gradually increasing temperature in a closed vessel so as to expel part of the sulphur dioxide and collect it in the gas space of the said vessel, the silicic acid being deposited thereby together with aluminium compounds, allowing the mixture of solution and deposit to cool down and the sulphur dioxide evolved during heating to be again absorbed by the solution cooling down, separating the solution from the precipitate and recovering pure alumina therefrom by desulphiting.

19. A process of recovering pure alumina from a solution in aqueous sulphurous acid, which contains silicic acid together with aluminium compounds, consisting in heating the solution at gradually increasing temperature under its own vapor pressure, so as to exclude practically an escape of $SO_2$, until the solution commences to become turbid and the silicic acid finally coagulates, after which the solution is left in contact with the precipitate until cooled down, and thereafter separated therefrom.

20. A process of recovering pure alumina from a solution in aqueous sulphurous acid, which contains silicic acid together with aluminium compounds, consisting in heating the solution at gradually increasing temperature while expelling part of the sulphur dioxide, the silicic acid being deposited thereby together with aluminium compounds, allowing the mixture of solution and solids to cool down while re-introducing during the period of cooling the part of sulphur dioxide expelled during the period of heating, separating the solution from the precipitate and recovering pure alumina by desulphiting the solution.

RICHARD STAUFER.
KAMILLO KONOPICKY.